No. 673,544. Patented May 7, 1901.
J. M. KING.
PRESS FOR COTTON, WOOL, HAY, &c.
(Application filed May 22, 1900.)
(No Model.) 6 Sheets—Sheet 1.

Witnesses
Inventor
John M. King
Attorney

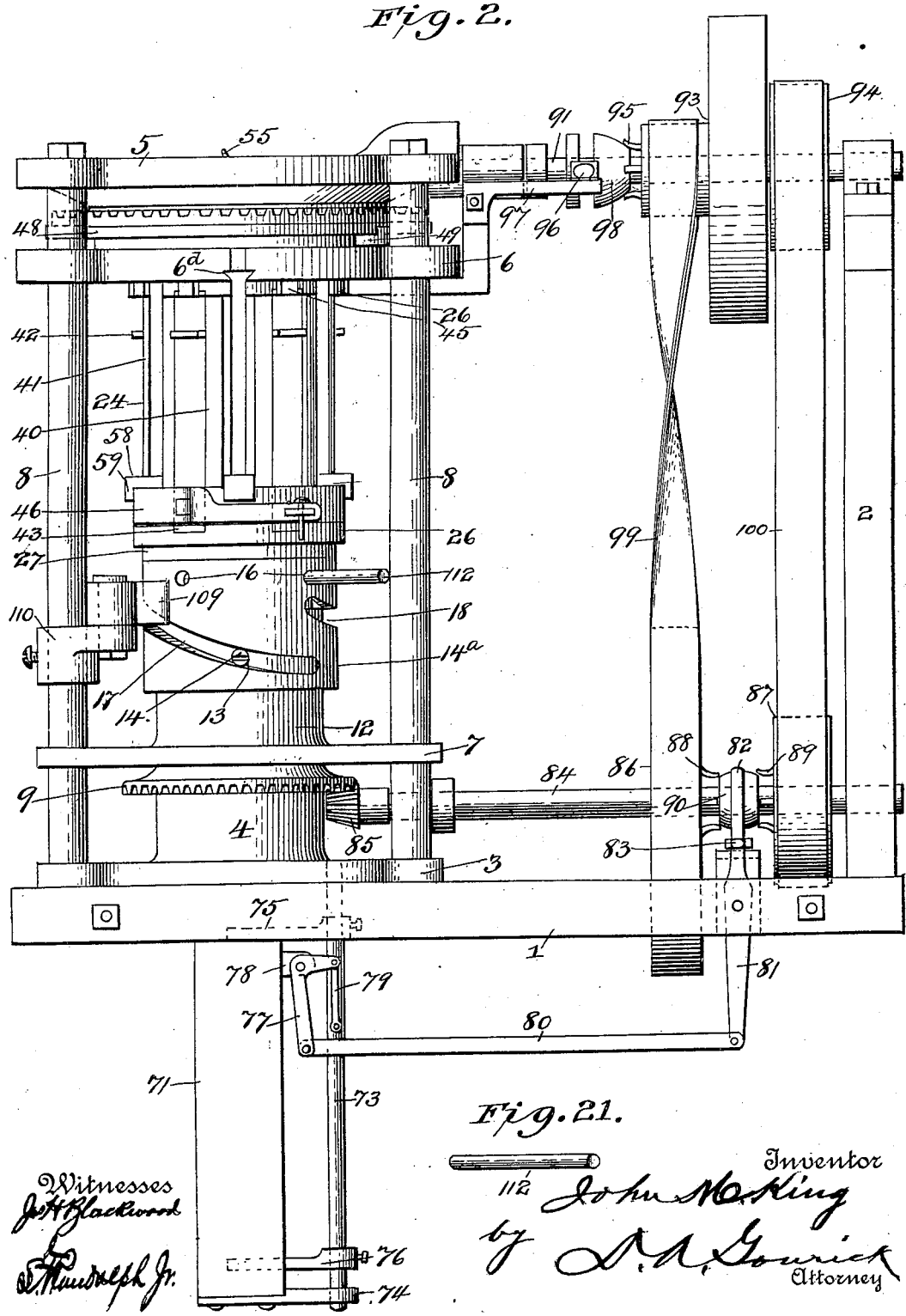

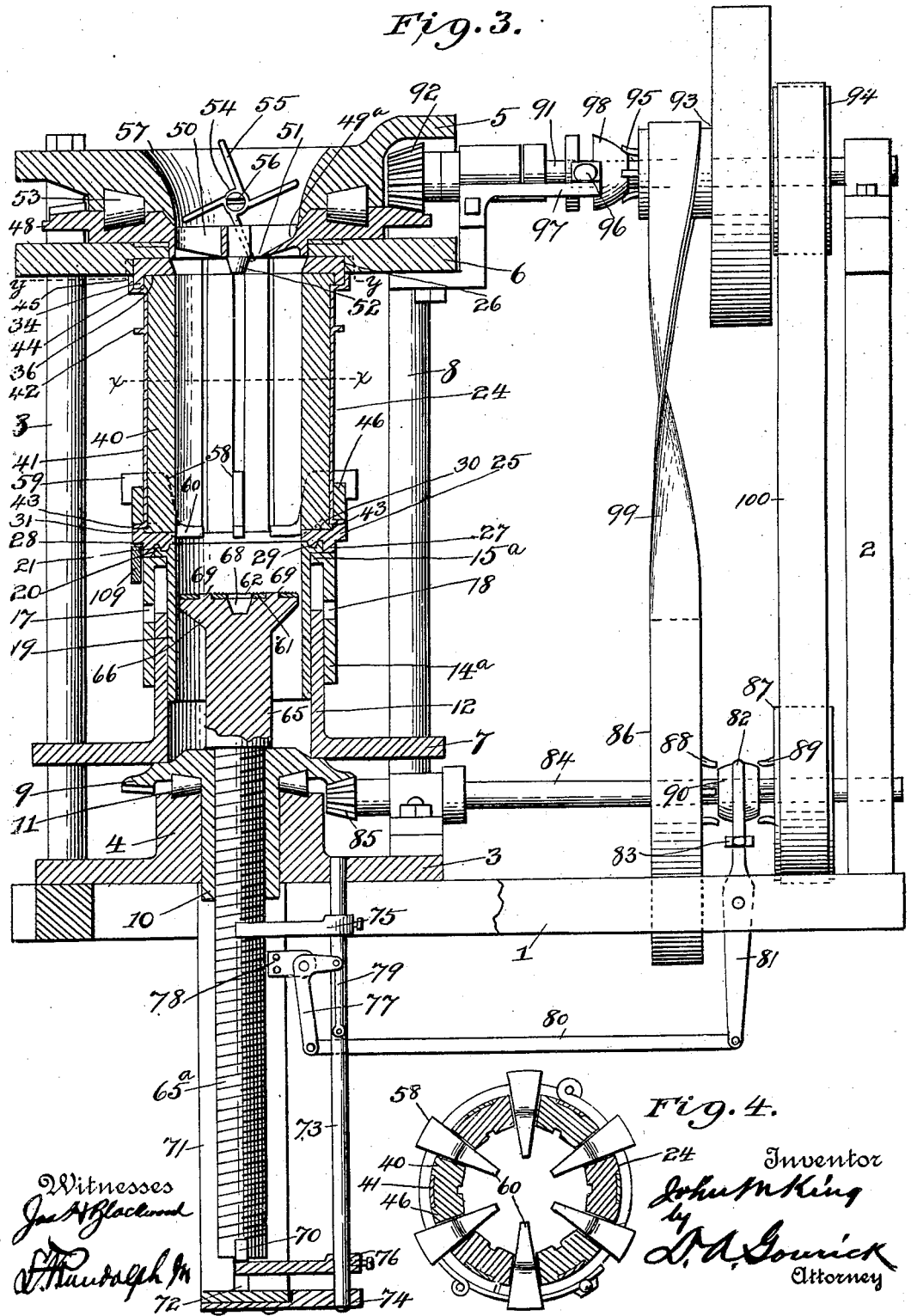

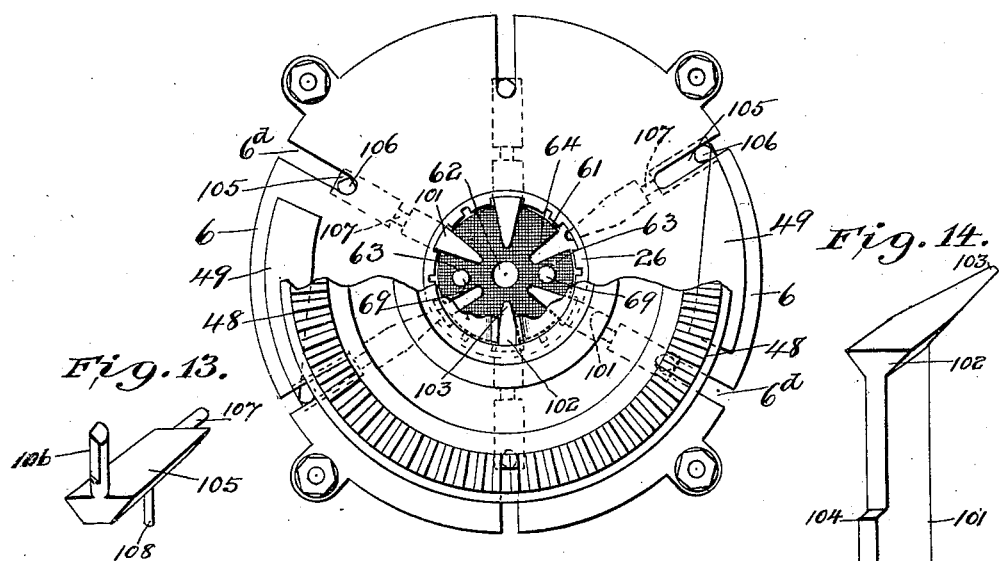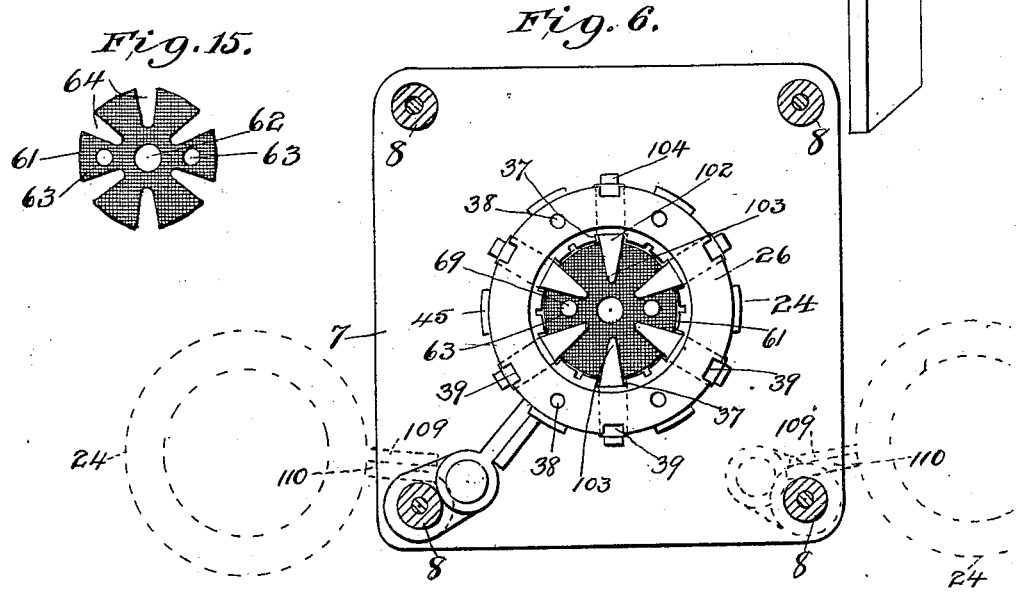

No. 673,544. Patented May 7, 1901.
J. M. KING.
PRESS FOR COTTON, WOOL, HAY, &c.
(Application filed May 22, 1900.)
(No Model.) 6 Sheets—Sheet 5.
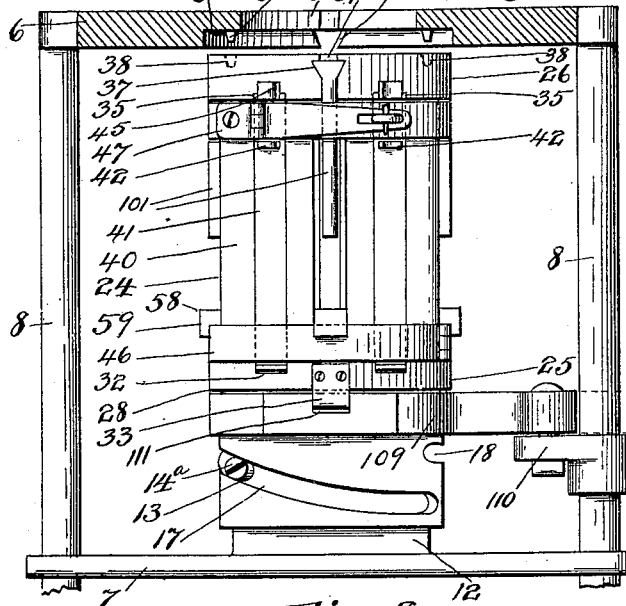
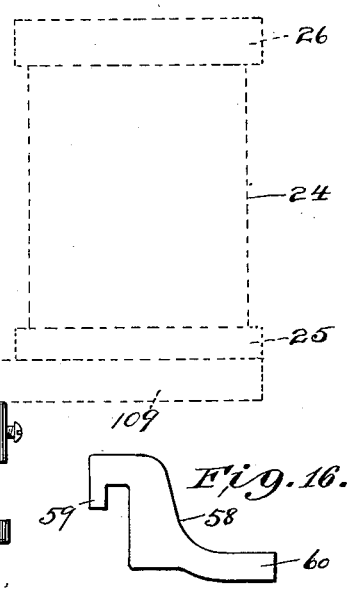
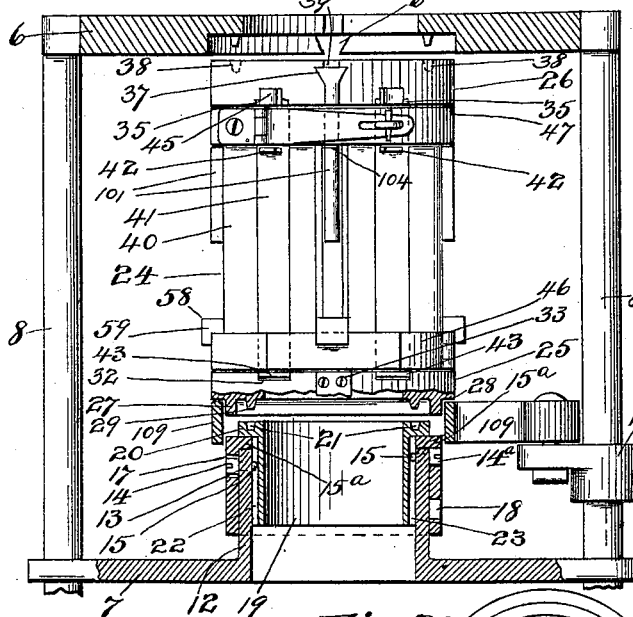
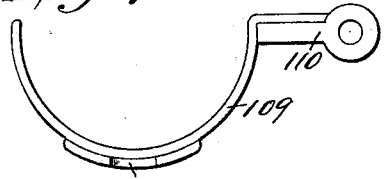
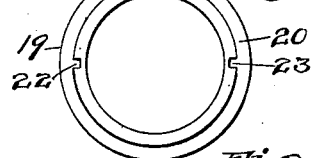
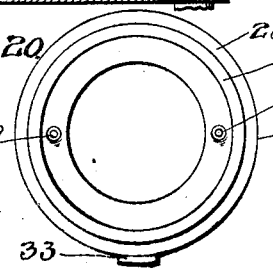
Witnesses
Jos H Blackwood
V H Randolph Jr
Inventor
John M King
by D A Gourick
Attorney No. 673,544. Patented May 7, 1901.
J. M. KING.
PRESS FOR COTTON, WOOL, HAY, &c.
(Application filed May 22, 1900.)
(No Model.) 6 Sheets—Sheet 6.
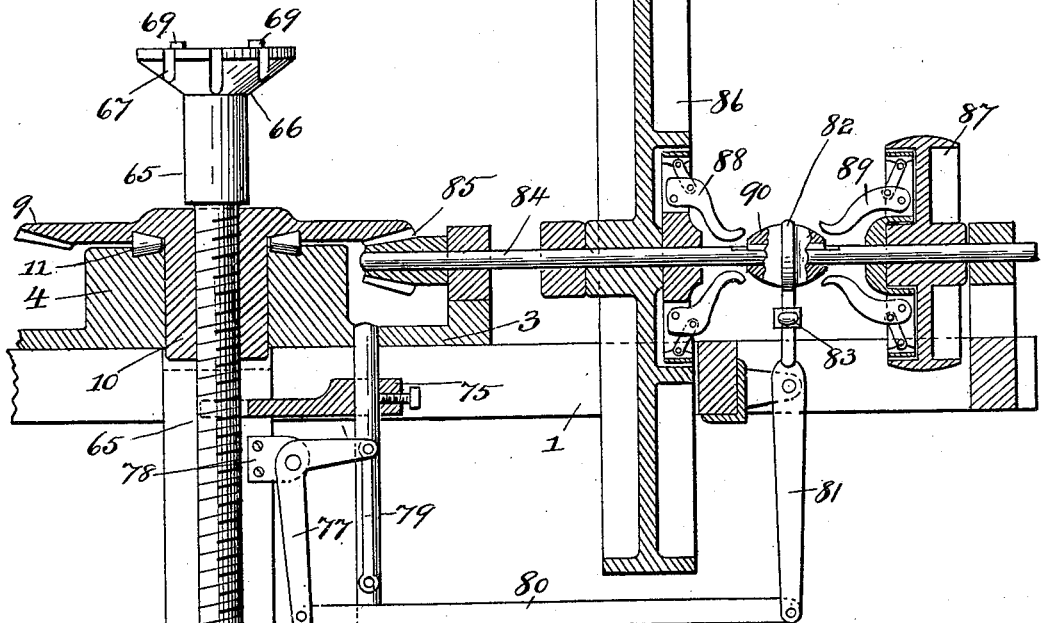
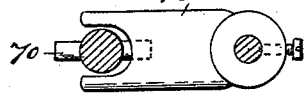
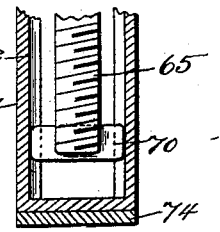
Witnesses  
Jas H Lockwood  
A Randolph Jr.
Inventor  
John M. King  
by D. A. Gourick  
Attorney

UNITED STATES PATENT OFFICE.

JOHN MORRIS KING, OF WACO, TEXAS, ASSIGNOR OF ONE-FOURTH TO JOHN BALIE FINKS, OF FORT WORTH, TEXAS.

PRESS FOR COTTON, WOOL, HAY, &c.

SPECIFICATION forming part of Letters Patent No. 673,544, dated May 7, 1901.

Application filed May 22, 1900. Serial No. 17,595. (No model.)

*To all whom it may concern:*

Be it known that I, JOHN MORRIS KING, a citizen of the United States, residing at Waco, in the county of McLennan and State of Texas, have invented certain new and useful Improvements in Presses for Cotton, Wool, Hay, Hair, &c., of which the following is a specification.

My invention relates to improvements in presses for cotton, wool, hair, &c., and has for its object to provide a press which will compress the cotton or other material into bales of hexagon, cylindrical, or other shapes, the shape of the bale corresponding with the shape of the bale-receptacle used. I preferably make my bales of hexagon shape to better adapt them to be stored compactly in ships, warehouses, and other places, and thus economize space; also, to vary the compression or density of the cotton or other material to any desired degree, to compress it so that it will not be damaged, and so evenly and compactly that there will be no necessity for recompressing before shipment and which will not expand to any considerable degree after its arrival at its destination.

It further has for its object to provide a press that is simple and inexpensive in construction, effective in operation, and which is adapted to be operated at very little expense.

My invention consists in the construction, combination, and arrangement of the several parts, as hereinafter more fully described and claimed.

Figure 1:
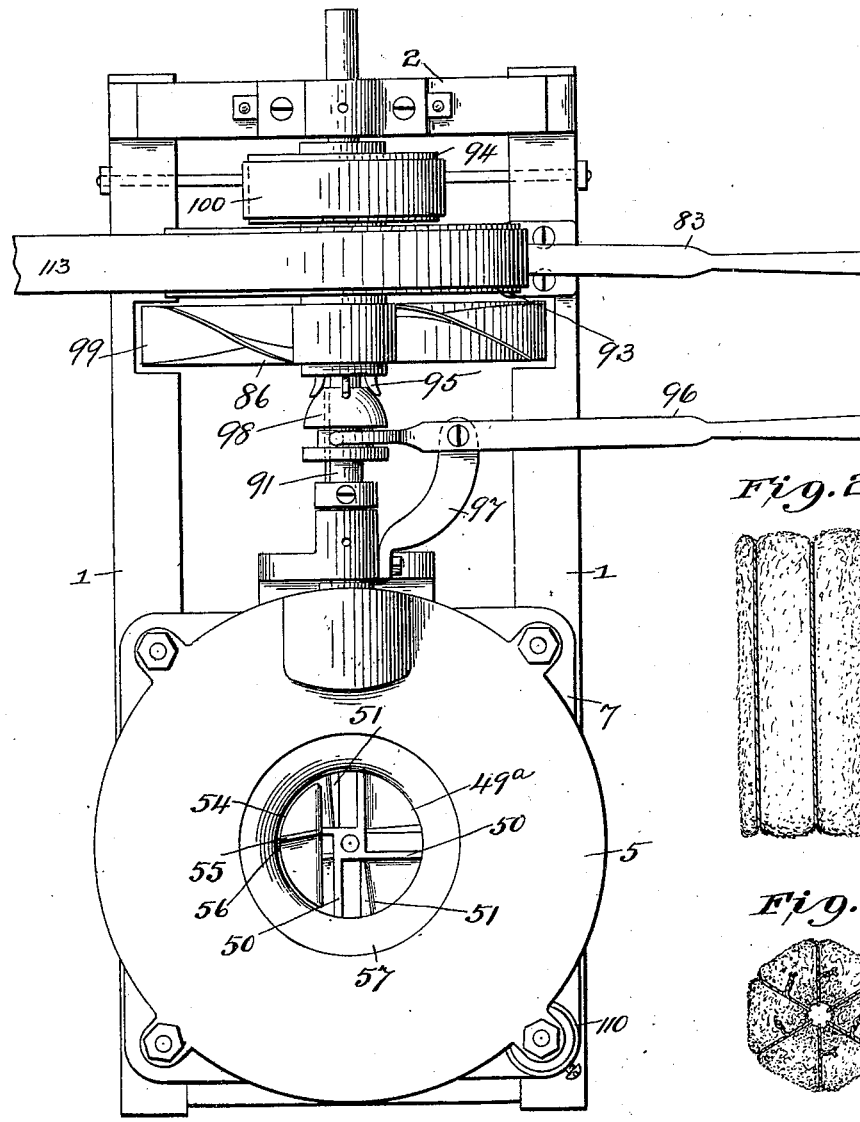
Figure 22:
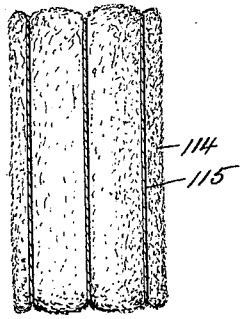
Figure 23:
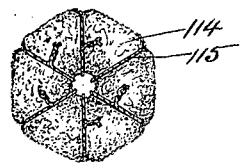

Referring to the drawings which illustrate my invention, Figure 1 is a top plan view; Fig. 2, a side view in elevation; Fig. 3, a central longitudinal section, partly in elevation; Fig. 4, a cross-section on line $x\,x$ of Fig. 3; Fig. 5, a top plan view of the body of the press with the top feed-plate broken away; Fig. 6, a cross-section on line $y\,y$ of Fig. 3; Figs. 7 and 8, side views, partly in section, of the bale-receptacle; Fig. 9, an enlarged sectional view of the automatic cut-off mechanism and the friction-clutch of the lower driving-shaft; Figs. 10 and 11, detail top plan views of the trip-arms; Fig. 12, a detail sectional view of the lower end of the compress-screw; Fig. 13, an enlarged detail perspective view of one of the slidable plates; Fig. 14, an enlarged perspective view of one of the severing-fingers; Fig. 15, a top plan view of the bale-supporting plate; Fig. 16, an enlarged side view of one of the brackets for holding the bale; Fig. 17, a top plan view of one of the pivoted arms by means of which the bale and bale-receptacle are swung laterally after the bale has been compressed; Fig. 18, a bottom plan view of the sleeve for supporting the bale-receptacle; Fig. 19, a central vertical section of the same; Fig. 20, a top plan view of the bottom ring of the bale-receptacle; Fig. 21, a perspective view of the removable handle for operating the cam-sleeve; Fig. 22, a side view in elevation of the completed bale, and Fig. 23 a top plan view of the same.

In the drawings, in which like numerals denote like parts throughout the several views, 1 represents a suitable framework, provided with uprights 2 at one end and which is mounted on a foundation of brick, stone, or other suitable material.

The frame of the press proper consists of a base-plate 3, mounted on the framework 1 and provided with an upwardly-projecting hub 4, a top or cap plate 5, and two intermediate plates 6 and 7, supported at the corners by posts 8, rising from the said base-plate.

9 is a bevel gear-wheel provided with an internally-screw-threaded sleeve 10, which revolves in the hub 4 of the base-plate.

11 represents suitable roller-bearings interposed between the bevel gear-wheel and the hub of the base-plate. The plate 6 is provided with an annular recess $6^a$, pins or lugs $6^b$, a central opening $6^c$, and dovetail slots $6^d$. The plate 7 is provided with an upwardly-projecting hub 12, having guide pins or screws 13, having heads 14 projecting outwardly and ends 15 projecting inwardly from the same.

$14^a$ is a cam-sleeve mounted and adapted to slide up and down and rotate on the outside of hub 12 of plate 7, said cam-sleeve provided at the top with an inner annular flange $15^a$ and in the body thereof with holes 16 and with inclined cam-slots 17 and 18, which engage and slide on the heads 14 of the screws 13.

19 is the sleeve which supports the bale-receptacle and which is provided with a flange 20 at the top, the upper surface of which is provided with recesses 21 and vertical grooves 22 and 23 on its opposite sides, into which the inner ends 15 of screws 13 extend. The sleeve 19 is mounted in the inside of the hub 12 and adapted to move vertically therein, and its flange 20 rests on the top of the flange 15ª of the cam-sleeve 14ª.

24 is the bale-compressing chamber or receptacle, which is provided with bottom and top rings 25 and 26, the lower portion of the bottom ring 25 having a downwardly-depending flange 27, an annular shoulder 28, and pins or lugs 29, and the upper portion having formed thereon an annular recess 30, having a series of radial slots for the bale-tie wires, an upwardly-projecting flange 31, having a series of slots 32 in its edge, and a lug 33, depending downwardly from the periphery of said flange 31. The top ring 26 is provided with a downwardly-depending flange 34, having a series of slots 35 in its edge, an annular recess 36, with a series of radial dovetail slots 37, which extend through the flange 34, and also with holes 38, a series of slots 39 in its upper surface, and a series of radial slots in its inner periphery for the bale-tie wires. The said top ring 26 is adapted when moved upward to be seated in the recess 6ª of the plate 6 and the holes 38 thereof to engage the pins 6ᵇ of plate 6, and thereby hold the top ring securely in place. The recess 6ᶜ in plate 6 has the revoluble feed-plate 48 seated therein.

40 represents a series of staves or slats, each provided on its inner surface with a longitudinal groove for the bale-tie wire and on its outer surface with a strip 41 of metal or other material, provided with a lug 42 and having its lower end bent outward to form a lip 43, its upper end bent to form a shoulder 44 and terminating in an upwardly-projecting lip 45.

The lower ends of the slats or staves are adapted to be seated in the annular recess 30 of the bottom ring 25 of the bale-compressing receptacle, and the lips 47 of the strips 45 are adapted to be seated in the slots 32 of the flange of the said ring 25. The upper ends of the slats or staves are adapted to be seated in the annular recess 36 of the top ring 26 of the bale-compressing receptacle and the upper ends of the strips 41 in the slots 35 and the lips 45 thereof to engage the outer surface of said top ring 26.

46 and 47 are bands provided with pivoted latches and locking-pins. The band 46 rests on top of the flange 31 of the ring 25 and also engages the lips 43 of the strips 41 and encircles the staves 40 and holds them securely at the bottom. The band 47 encircles the staves 40 between the lugs 42 and the shoulders 44 and holds them together at the top. The band 47 is not put on until the bale has been formed and is ready to be removed.

48 is a revoluble feed-plate provided with a bevel-gear on its upper surface and cams 49 on its lower surface, said feed-plate provided with a central opening 49ª, divided by partitions 50 into a series of angular feed-slots 51, which slant downward from the opening 49ª. The number of these feed-slots may be increased or diminished, as desired.

52 is a conical projection extending downward from the center of the feed-plate 48, which prevents the cotton from forming too compactly in the center of the bale, and thus leaving an opening through the center of the bale from end to end, which facilitates the tying of the bale.

I have shown the conical projection 52 as formed integral with the feed-plate; but it may be formed on a separate plate and said plate fastened to the bottom surface of the feed-plate, so that in case of wear a new plate and projection could be substituted.

53 represents suitable roller-bearings.

54 is a feed-wheel provided with blades 55 and mounted and adapted to be rotated on a screw or pin 56 in the flaring opening 57 of the cap or top plate 5, said blades 55 being adapted to be engaged by the partitions 50 of the revoluble feed-plate 48 one at a time, and thereby rotate the wheel 54 and cause the blades to assist in forcing the cotton into the feed-slots 51.

58 represents series of brackets each having a hook 59 and an arm 60. Said brackets are hung on the band 46 between the staves or slats 40 by means of the hooks 59.

61 is the bale-supporting plate, which is provided with a central opening 62, two holes 63, and a number of radial slots 64, said bale-plate being corrugated or roughened on its upper surface for the purpose of holding the cotton and preventing its revolving with the feed-plate.

65 is the compressing-plunger, having a screw 65ª, which is mounted in the sleeve 10 of the bevel-gear 9 and provided with a head 66, carrying said bale-supporting plate, and having radial slots 67 and a central hole 68 for the purpose of receiving the cone-shaped projection 52 of the feed-plate 48.

69 represents pins or lugs on the top of the head 66, which are adapted to engage the holes 63 of the bale-supporting plate 61, and 70 a guide-plate at the lower end of the screw 65ª of the said compressing-plunger.

71 is a downwardly-extending bracket secured to the framework 1 and provided with vertical slots 72, in which the opposite ends of the said guide-plate engage and slide.

73 is a vertically-sliding rod, the upper end mounted in the base-plate 3 and the lower end in an arm 74, secured to the lower end of the bracket 71.

75 and 76 are upper and lower trip-arms secured to the rod 73 by set-screws.

77 is a bell-crank lever pivoted to a plate 78 on the bracket 71 and one arm of which is pivoted to a link 79, pivoted to the rod 73, and the opposite end pivoted to a horizontal lever 80, which is connected to a vertical lever 81, having a forked upper end 82.

83 is a hand-lever.

84 is the lower driving-shaft of the press, mounted in suitable bearings and provided with a pinion 85, which engages the bevel-gear 9, and large and small band or pulley wheels 86 and 87, having suitable friction-clutches 88 and 89, respectively.

90 is a cone-sleeve splined to the drive-shaft 84, to which the forked end 82 of the lever 81 is attached, said cone-sleeve adapted to be slid laterally by the hand-lever 83 or lever 81 and engage the friction-clutch of either of the band-wheels 86 or 87.

91 is the upper drive-shaft of the press, mounted in suitable bearings and provided with a pinion 92, which engages with the bevel-gear of the revoluble feed-plate 48.

93 and 94 are large and small pulley-wheels mounted on shaft 91.

95 is a friction-clutch, and 96 a forked hand-lever pivoted to the bracket 97, secured to the plate 6, and 98 a cone-sleeve adapted to be slid laterally by the hand-lever 96 and engage the friction-clutch 95.

99 and 100 are belts which connect the pulley-wheels of the upper and lower drive-shafts and communicate motion from one to the other.

101 represents severing-fingers, each provided with a dovetail-shaped head 102, having a point 103 and a shoulder 104. Said severing-fingers are adapted to be inserted in the dovetail slots $6^d$ of the plate 6 and the shoulders 104 thereof to be engaged by the band 47.

105 represents slidable plates, dovetail shape in cross-section, each having a pin or lug 106 on its upper surface and a lug 107 on its inner end and a downwardly-depending finger-piece 108 on its lower surface. Said plates are inserted in the dovetail slots $6^d$ of plate 6 and are adapted to be engaged by the cams 49 of the feed-plate 48 as it revolves and be moved inward and drive the points of the severing-fingers over the top of the bale.

109 represents semicircular arms, each pivoted to an adjustable bracket 110, secured by a set-screw to one of the posts 8 and provided with a slot 111. These brackets are adapted to be moved up and down to provide for different lengths of bale-receptacles. The arms 109 are adapted to engage the shoulder 28 of the bottom ring 25 and sustain the bale-receptacle after the bale has been completed and the same is lowered and to swing it laterally out of the press. The slot 111 is for the purpose of receiving the lug 33 of the ring 25 and securing the bale-receptacle to the said arm.

112 is a removable handle which is adapted to be inserted in any one of the holes 16 of the cam-sleeve and by which the cam-sleeve is revolved.

113 is the drive-belt of the press.

114 is the bale, and 115 represents the bale-ties.

Although I have shown the bale with a hole through the center, produced by providing the conical projection on the feed-plate and feeding the cotton into the bale-receptacle in spiral layers directly onto the head of the compressing-plunger, the conical projection may be reduced in size or dispensed with entirely and the bale made solid, and instead of the wire bale-ties iron bands or other ties may be used.

Two bale-receptacles and two pivoted arms for swinging said receptacles laterally are shown; but any number may be used. By constructing the compressing-receptacle of slats or staves with spaces between the same the air is allowed to escape from the bale more readily than if it were compressed in a solid receptacle. The longitudinal slots in the inner surface of the slats are adapted not only to accommodate the tie-wires, but also to provide means for the escape of air from the bale. The size of the bale may be increased or diminished by increasing or diminishing the size of the bale-receptacle, and the density of the bale may be varied by increasing or decreasing the speed of the downward movement of the compression-plunger by controlling the speed of the lower drive-shaft.

The compressing-plunger is shown in the drawings provided with a screw operated by a gear-wheel; but other means may be employed, if found desirable.

I do not wish to be limited to the exact construction as herein shown and described, as the same may be varied somewhat without departing from the spirit of my invention.

The operation of the press is as follows: Assuming that the compressing-plunger is down at its lowest limit, as shown in the drawings, with the cone-sleeve 90 on the lower drive-shaft 84 midway between the friction-clutches 88 and 89, the hand-lever 83 is moved to the left, which causes the said cone-sleeve to engage the friction-clutch 89 on the small pulley-wheel, and thereby operates the shaft 84, which communicates motion to the gear 9, and thereby causes the compressing-plunger, with its head 66 and the bale-plate 61, to ascend, and when said plunger has reached its highest limit or in proximity to the under side of the cap-plate it is automatically stopped and the conical projection of the feed-plate is seated in the hole 68 in said head, and the hand-lever 96 is moved to the left, which causes the cone-sleeve 98 to engage the clutch 95 of the pulley-wheel 93, and thereby impart motion to the upper drive-shaft 91 and to the pinion 92, which revolves the feed-plate 48 and imparts motion to the feed-wheel 54 by the partitions engaging the blades 50 of the said feed-wheel. A small quantity of cotton is first placed in the press on the bale-plate on top of the head of the compressing-plunger, and then cotton is fed into the gin and passes through the condenser and falls into the hopper of the press, preferably in broken sections, although it may be in a continuous bat. The feed-wheel forces the cotton-bat down into the slots of the feed-plate, and as soon as this cotton-bat comes in contact with the cotton already placed in the press it will tend to draw said bat through the slots in the said feed-plate and cause it to be deposited in a spiral layer directly onto the head of the compressing-plunger, and thus adds successive increments to the previously-introduced material and forces the subjacent column of compressed material downward in the bale-receptacle. Said plunger recedes downward at a speed regulated by the speed of the lower drive-shaft, which is controlled by the operator according to the density desired for the bale, and when the top of the bale-plate 61 reaches a point on a level with the upper plane of the arms 60 of the brackets 58 the bale will be caught and held on the top of said arms 60. This downward movement of the compressing-plunger continues until the guide-plate 70 comes in contact with the lower trip-arm 76, which will move the rod 73 downward, and thus automatically throw the cone-sleeve 90 out of engagement with the friction-clutch 88 and stop the operation of the compressing-plunger. The dirks 101 and the plungers 105 are then inserted in the slots 6$^d$ of the plate 6, and the upper drive-shaft still being in operation and operating the revolving feed-plate the two cams 49 of the same come in contact with two of the plungers 105, and thus simultaneously move them inward two at a time, and they in turn drive the points 103 of the dirks 101 over the top of the cotton-bale. The top band 47 is then applied and locked to the bale-receptacle, with its lower edge resting on the shoulders 104 of the said dirks. The cam-sleeve 14$^a$ is then revolved and moved downwardly by means of the handle 112 and the bale-receptacle 24 thereby lowered until the top ring 26 thereof clears the bottom of the plate 6 and the bottom ring 25 rests upon the pivoted arm 109. Said arm is then swung out laterally and the bale tied, the bale-receptacle taken apart, and the bale removed. A second bale-receptacle, which rests upon another pivoted arm and was assembled while the first bale was forming, is swung into place, and the press is again started by throwing the cone-sleeve 90 into engagement with the clutch 89 of the small pulley-wheel on the lower drive-shaft, and the compressing-plunger again ascends until the guide-plate 72 engages the upper trip-arm 75, when the rod 73 will be moved upward, which will automatically throw the cone-sleeve 90 out of engagement with the friction-clutch 89 and stop the operation of the compressing-plunger. This avoids any possibility of injury to the press, which would occur if the compressing-plunger were adapted to be stopped by means of a hand-lever only and the operator should forget to operate it at the proper time. If it should be found that the compressing-plunger is descending too rapidly to form a bale of proper density, it can be stopped by disengaging the cone-sleeve 90 from the clutch 88 by means of the hand-lever 83 and allow the plunger to remain stationary until the bale has been brought up to the proper or desired density, when the cone-sleeve can be again thrown into engagement with the clutch and the plunger continue its downward movement, as before.

Having thus described my invention, what I claim is—

1. In a cotton or other press a bale-receptacle, a compressing-plunger and means for operating the same, a rotary feed-plate having a series of partitions with feed-openings between the same, and means engaged and actuated by the partitions of said feed-plate for forcing the cotton or other material through said feed-openings, substantially as shown and described.

2. In a cotton or other press, a bale-receptacle, a compressing-plunger, a cap-plate provided with an opening, a rotary slotted feed-plate below said cap-plate adapted to deliver cotton or other material onto the head of said plunger in said receptacle, a rotary feed-wheel having a series of blades and mounted in the opening of said cap-plate for forcing said material into the slotted feed-plate, said feed-plate engaging the blades of the feed-wheel and thereby rotating the same, substantially as shown and described.

3. In a cotton or other press a bale-receptacle, a series of removable brackets for engaging the lower end of the bale, and means in connection with said receptacle for supporting and retaining said brackets in place, in combination with a plunger provided with a bale-supporting plate on its face and having slots in its edge for the passage of the brackets, substantially as shown and described.

4. In a cotton or other press, a top or cap plate provided with a feed-opening, a feed-wheel mounted in said opening and provided with blades, and means to engage the said blades and thereby rotate the said feed-wheel, substantially as shown and described.

5. In a cotton or other press a top or cap plate having an opening, a feed-wheel mounted therein provided with blades the rear edges of which are shaped to conform to the contour or walls of said opening, and means for rotating said feed-wheel, substantially as shown and described.

6. In a cotton or other press, a top or cap plate provided with an opening, a feed-wheel having blades mounted in said opening, a revoluble feed-plate adapted to engage said blades and rotate said feed-wheel, substantially as shown and described.

7. In a cotton or other press a series of severing-fingers each provided with a body portion, a shoulder on the rear side, and a pointed head at the top thereof projecting beyond said body portion, substantially as shown and described.

8. In a cotton or other press, a bale-receptacle and a cam-sleeve carrying said receptacle adapted to raise it into operative position and lower it for the purpose of removal, and means for supporting said cam-sleeve, substantially as shown and described.

9. In a cotton or other press, a bale-receptacle, a cam-sleeve carrying said receptacle adapted to raise it into operative position and lower it for the purpose of removal, means for supporting the cam-sleeve, and a removable handle for operating the cam-sleeve, substantially as shown and described.

10. In a cotton or other press, means for swinging the bale-receptacle laterally consisting of a curved arm adapted to embrace said receptacle, said arm pivoted to an adjustable bracket, and means for securing said bracket to the press, substantially as shown and described.

11. In a cotton or other press, a frame, a curved arm pivoted thereto having a slot, a bale-receptacle provided with a depending lug adapted to engage said slot and secure said bale-receptacle to the arm, said arm adapted to swing said bale-receptacle laterally, substantially as shown and described.

12. In a cotton or other press a plunger provided with a screw having a guide-plate at its lower end, a depending bracket provided with a plate, a bell-crank lever pivoted on said plate, a sliding rod provided with upper and lower trip-arms, a link connecting said lever to the sliding rod, a shaft for operating the said plunger provided with clutches and a sleeve, a vertical lever adapted to operate said sleeve and engage said clutches, and a lever connecting said vertical lever to the bell-crank lever, substantially as shown and described.

13. In a cotton or other press, a bale-receptacle, a bale-supporting plate having holes, and a plunger provided with a head having lugs adapted to engage the holes in the said bale-plate and hold the same securely in place on the top of the plunger, substantially as shown and described.

14. In a cotton or other press, a bale-receptacle, a bale-supporting plate with holes, a plunger provided with a head having lugs to engage said holes, and a recess, and a revoluble feed-plate provided with a depending projection adapted to engage said recess, substantially as shown and described.

15. In a cotton or other press, a slatted bale-receptacle provided with a band at its lower end, and a series of brackets each with a hook on one end and an arm on the opposite end, and a bale-supporting plate, said hooks adapted to be hooked over said band, and said arms to support the bale, substantially as shown and described.

16. In a cotton or other press, a plate having a recess, a bale-receptacle, the upper end of which is adapted to be seated in said recess by moving said bale-receptacle upward, and a cam-sleeve for operating said bale-receptacle, substantially as shown and described.

17. In a cotton or other press, a plate having a recess, a plate having a hub, a vertically-movable sleeve in said hub, a bale-receptacle supported on said sleeve, and means for moving said sleeve and bale-receptacle, substantially as shown and described.

18. In a cotton or other press, an upper plate having a recess, a lower plate having a hub, a cam-sleeve on the outside of said hub with a flange adapted to rest on the top thereof, a movable sleeve on the inside of said hub having a flange adapted to rest on the flange of said adjustable sleeve, and a bale-receptacle adapted to be supported on said adjustable sleeve, and be moved up and down by means of said cam-sleeve, substantially as shown and described.

19. In a cotton or other press, a bale-receptacle provided with a lug, a curved arm pivoted on an adjustable bracket and adapted to support and swing said receptacle laterally, and a slot in said arm adapted to be engaged by said lug, substantially as shown and described.

20. In a cotton or other press, a frame having upper and lower drive-shafts, a revoluble feed-plate geared to said upper drive-shaft, a bale-receptacle, a curved pivoted arm adapted to embrace and swing said bale-receptacle laterally, a compressing-plunger, means for connecting said plunger with the lower drive-shaft, and means for operating the same, substantially as shown and described.

21. In a cotton or other press, a bale-receptacle provided with upper and lower rings, slats having strips provided with a shoulder and a lip at their upper ends, and a lip at their lower ends, and a lug, a band adapted to encircle the bale-receptacle between the said shoulders and lugs at the upper ends of the slats, and a band adapted to encircle the bale-receptacle and rest on top of the lips at the lower ends of the slats, substantially as shown and described.

22. In a cotton or other press, a bale-supporting plate provided with radial slots in its edge through which the arms of the bale-supporting brackets are adapted to pass, a central opening to receive the projection of the feed-plate, and holes to receive the lugs on the head of the plunger, substantially as shown and described.

23. In a cotton or other press, a series of brackets for sustaining the bale, one end provided with a downwardly-projecting hook and the opposite end with a rearwardly-extending arm, substantially as shown and described.

24. In a cotton or other press, a bale-receptacle, a band for encircling said receptacle, a series of brackets one end provided with a hook adapted to engage said band, and the opposite end provided with a rearwardly-extending arm adapted to sustain a bale, substantially as shown and described.

25. In a cotton or other press, a plate at the top thereof provided with a recess, a bale-receptacle adapted to be moved upward and engage said recess, said bale-receptacle provided with slats, a band for encircling the lower ends of the same, a series of brackets for insertion between the slats each provided with a hook at one end to engage said band and with an arm on the opposite end to sustain a bale, substantially as shown and described.

26. In a cotton or other press, a cap-plate provided with a feed-wheel, a rotary feed-plate below the same having a series of feed-slots and a series of partitions, said partitions adapted to engage said feed-wheel and rotate it, substantially as shown and described.

27. In a cotton or other press, a bale-receptacle, means for swinging said bale-receptacle laterally, and a cam-sleeve for raising said receptacle into operative position, and for lowering the same to permit of its removal, and means for supporting said cam-sleeve, substantially as shown and described.

28. In a cotton or other press, a series of severing-fingers, a series of sliding plates each provided with a lug on the upper surface having a beveled edge, a pin or lug on the end, and a finger-piece on the lower surface, and means for operating said sliding plates for actuating said severing-fingers, substantially as shown and described.

29. In a cotton or other press, a series of severing-fingers, a series of sliding plates each provided with a pin or lug on the end, a finger-piece on the lower surface, a lug on the upper surface having a beveled edge, and a revoluble plate provided with stationary cams, adapted to engage the beveled edge of each of the lugs of the sliding plates and drive said sliding plates together with the severing-fingers inward, substantially as shown and described.

30. In a cotton or other press, a bale-receptacle, a compressing-plunger, a plate at the upper portion of said press having a recess to receive the upper end of the bale-receptacle, and means for seating said receptacle therein, a top or cap plate, a revoluble feed-plate between said plates provided with feed-openings for delivering cotton or other material onto the head of said compressing-plunger, substantially as shown and described.

31. In a cotton or other press a top or cap plate provided with an opening therethrough, a feed-wheel mounted to rotate in a vertical plane in said opening and provided with blades, and a revoluble feed-plate adapted to engage said blades and rotate said feed-wheel, substantially as shown and described.

32. In a cotton or other press, a top or cap plate provided with an opening therethrough, a feed-wheel mounted to rotate in a vertical plane in said opening and provided with blades having curved rear edges, and a revoluble feed-plate adapted to engage said blades and rotate said feed-wheel, substantially as shown and described.

33. In a cotton or other press, a bale-receptacle, a plate at the upper portion of said press having a recess to receive the upper end of the bale-receptacle, and means for moving said bale-receptacle upward and seating and holding it in said recess, substantially as shown and described.

34. In a cotton or other press, a plate at the lower end thereof provided with a hub having pins, a sleeve on the outside of said hub provided with cam-slots with which said pins are adapted to engage, a sleeve on the inside of said hub, a bale-receptacle supported on said sleeve, and means for operating said sleeve and bale-receptacle, substantially as shown and described.

35. In a cotton or other press, a plate at the lower end having a hub, a cam-sleeve on the outside thereof, a movable sleeve on the inside of said hub, a bale-receptacle provided with a ring at its lower end which rests on top of the movable sleeve and is provided with a flange, and an arm adapted to engage the said flange and swing said bale-receptacle laterally, substantially as shown and described.

36. In a cotton or other press a plate at the lower end thereof provided with a hub having screws or lugs, a sleeve on the inside of said hub provided with grooves with which said screws engage, a bale-receptacle on said sleeve, a cam-sleeve on the outside of said hub adapted to operate the sleeve on the inside thereof and raise and lower the bale-receptacle, and means for operating said cam-sleeve, substantially as shown and described.

37. In a cotton or other press, a plate at the lower end thereof provided with a hub having pins, a sleeve on the outside of said hub provided with cam-slots with which said pins are adapted to engage, and a flange, a sleeve on the inside of said hub provided with a flange adapted to rest on top of the flange of the cam-sleeve, in combination with a bale-receptacle provided with a ring at its lower end adapted to rest on the flange of the sleeve in the inside of said hub, and means for operating said sleeve and bale-receptacle, substantially as shown and described.

38. In a cotton or other press, a plate at the top thereof provided with a series of slots, each having a sliding plate therein provided with a pin or lug on the end, a finger-piece on the lower surface, a lug on the upper surface, and means to engage said lugs and operate said plates, substantially as shown and described.

In testimony whereof I hereto affix my signature in the presence of two witnesses.

JOHN MORRIS KING.

Witnesses:
M. B. DAVIS,
ROSS BATTLE.